United States Patent [19]

Loren

[11] Patent Number: 4,633,559

[45] Date of Patent: Jan. 6, 1987

[54] APPARATUS FOR STAKING

[75] Inventor: Norman S. Loren, Warren, Mich.

[73] Assignee: Michael Ladney, Grosse Pointe Shores, Mich.

[21] Appl. No.: 712,671

[22] Filed: Mar. 18, 1985

[51] Int. Cl.[4] .................... B23P 11/00; B21P 39/00; B29C 65/00

[52] U.S. Cl. ............................ 29/243.5; 29/509; 264/249

[58] Field of Search ............... 29/509, 243.5, 243.52; 425/110, 112; 264/249

[56] References Cited

U.S. PATENT DOCUMENTS

| | | | |
|---|---|---|---|
| 453,182 | 6/1891 | Gaines | 29/243.5 |
| 2,521,505 | 9/1950 | Doyle | 269/310 |
| 2,941,428 | 6/1960 | Riggio et al. | 29/243.52 |
| 3,367,809 | 2/1968 | Soloff | 264/249 |
| 4,041,596 | 8/1977 | Mink | 29/243.53 |
| 4,181,698 | 1/1980 | Hayes | 264/249 |

Primary Examiner—Howard N. Goldberg
Assistant Examiner—Steven Nichols
Attorney, Agent, or Firm—Brooks & Kushman

[57] ABSTRACT

A method and apparatus for staking a formable projection, for example, a tab or boss, to retain plural articles in a unitary assembly. A projection on a first article is brought into registering position with an aperture in a second article to form the assembly. The assembly is clamped by a spring-loaded clamp pad which bears against the second article and surrounds the projection. The projection is then staked by action of a tool which travels reciprocally within the clamp pad and has a tip which cooperates with the clamp pad to form a cavity of desired shape. The forming stroke of the tool is against the resistive force of the spring, which increases the clamping force of the clamp pad. The formed projection is therefore contained within the inner boundary of the clamp pad and tool tip to thereby promote uniform head formation.

19 Claims, 9 Drawing Figures

APPARATUS FOR STAKING

TECHNICAL FIELD

This invention relates to a method and apparatus for staking a formable projection to secure plural articles in a unitary assembly.

BACKGROUND ART

The process of staking is a known technique for securing articles in assembled relation and has found widespread application with plastic molded articles. Broadly, in this process a formable projection on one article is brought into registration with an aperture in another article to form the assembly. The projection may have been or can concurrently be prepared for staking, e.g. heat softened, and staked into a head shape by action of a forming die tool.

The retention strength of the staked joint is directly related to the integrity of the formed head. If the head is formed irregularly or only partially the area of retention will be reduced and the holding strength lessened. An irregularly or partially formed head can be caused by escape of fluent material from the site of the staking operation. Additionally, if the dimensions of the formable projections vary, a standard stroke or tool shape will cause spattering of material with an oversized projection, or underformation of the head with an undersized projection.

It is the objective of the present invention to provide a method and apparatus for staking formable projections that promotes uniform head formation and location to enhance retention strength.

The following United States patents are of interest as background art to the present invention: U.S. Pat. Nos. 2,705,346; 3,358,550; 3,591,996; 3,929,943; 4,377,549; and 4,456,576.

DISCLOSURE OF THE INVENTION

The present invention is a method and apparatus for staking a formable projection which realizes the objective of improved quality in the formation of the staked head to promote maximum retention strength of assembled articles.

In broad terms, the invention is practiced by bringing a projection, e.g. an integral boss on a plastic molded piece, into registering position with an aperture in another article to form the assembly. The projection may be prepared for staking as appropriate or necessary, such as by heat softening. The assembly is clamped into working position by action of spring-loaded clamp pads. The clamp pads bear against the assembly and surrounds the formable projection. A staking tool travels through a staking stroke within the clamp pads against the countering influence of the spring. As the tool travels through the staking stroke it increases the clamping pressure applied on the assembly by the clamp pads. This feature assures that during formation of the projection the fluent material will be contained in the volume within the staking tool and clamp pads.

In another feature of the invention, the die tip on the staking tool and the inner surfaces of the clamp pads are configured to cooperatively define a die cavity for forming the staked head.

The invention admits to staking of projections of varying shapes, e.g. studs, tabs, and hollow bosses. In the case of a hollow boss, the method is practiced using a spring-loaded mandrel to provide axial support for the projection as it undergoes formation. In this case the mandrel is likewise spring-loaded to lead the staking tool in the staking stroke and lag the tool during retraction from the staked head.

The staking of more than one projection can be performed by a like number of staking devices. An article with several projections of different configuration, e.g. tabs or studs, can be secured by selection of staking devices of appropriate shape.

In yet another feature of the invention plural staking tools may be used to simultaneously stake several projections with a single actuator while taking into account possible variations in dimensions of tooling and projections. In this feature of the invention each staking tool has a spring-loaded mounting on a carrier to permit compensation among the tools for variations in the sizes of the several projections, or staking tools, or both.

Other features and advantages of the present invention will become apparent in the following detailed description.

BEST MODE FOR CARRYING OUT THE INVENTION

Figure 1:
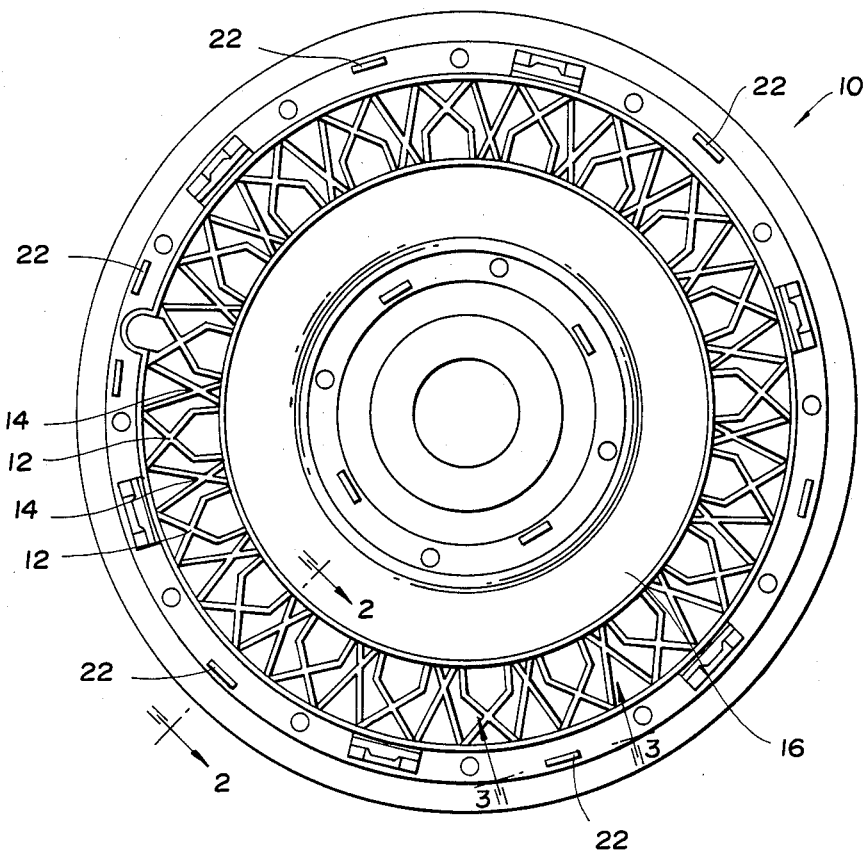
FIG. 1 is a view of the rear face of a plastic simulated wire wheel cover assembly which is representative of a practical application for the method of the present invention.

In reference to FIG. 1, a plastic simulated wire wheel cover shown generally at 10 is representative of an application of the method of the present invention. The wheel cover 10 comprises inner and outer pieces concentrically mounted into a unitary assembly to impart to the wheel cover an authentic depth appearance characteristic of a conventional vehicle wire wheel. U.S. Pat. No. 4,462,640 discloses the type of plastic simulated wire wheel cover shown at 10, but does not disclose the staking process or results obtained by the present invention.

The wheel cover 10 comprises two sets of spokes 12 and 14 radiating from a hub 16. The spokes 12 are formed integrally with the inner section of the assembly, and the spokes 14 are formed integrally with the outer section and are superimposed over the spokes 12 to provide the authentic depth appearance.

The inner and outer sections of the wheel cover 10 are secured in assembled relation by tab like projections 22 which are staked by the process of the present invention.

Figures 2, 3:
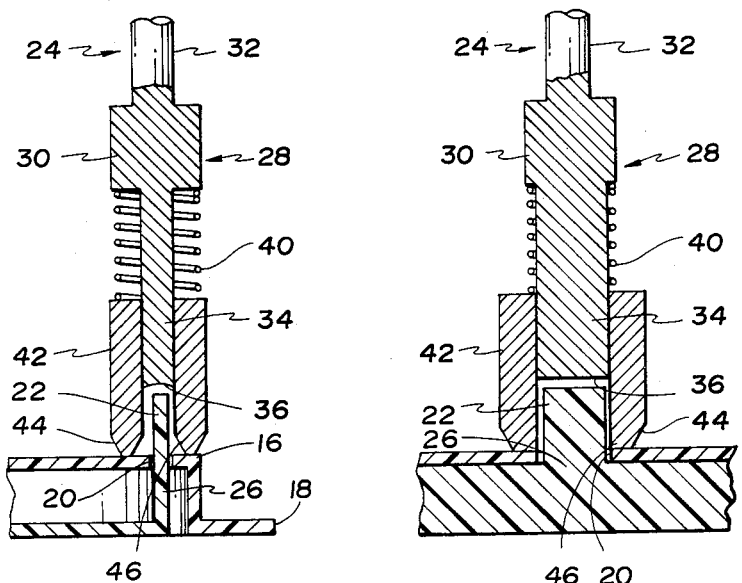
FIG. 2 is a partial sectional view taken along line 2—2 of FIG. 1 showing a first elevation of a staking device of the present invention preparatory to staking a tab.
FIG. 3 is a partial sectional view taken along line 3—3 of FIG. 1 showing a second elevation of the staking device of FIG. 2.

With reference to FIGS. 2 and 3, each tab like projection 22 has a stem portion 26 formed integrally with the outer section 18 of the wheel cover. The projection 22 is in registering position with an aperture 20 formed in the inner section 16 of the wheel cover. The aperture 20 is of complementary size and shape to the projection 22.

A staking device incorporating features of the present invention is shown generally at 24. The device 24 includes a staking tool 28 comprising a head 30 and shank 34. The head 30 is connected to a drive rod 32 which imparts controlled reciprocating motion to the staking tool. The lower extreme of the shank 34 defines a die tip 36 of a shape appropriate for the staked head.

The staking device 24 also includes clamp pads 42 which contact against the inner section 16 to clamp the sections 16 and 18 in assembled relation while the projection 22 undergoes staking. The clamp pads 42 have their lower ends tapered. Specifically, the outer side is tapered as shown at 44, and the inner side is tapered as at 46 to a shape appropriate for the staked head.

The staking tool 28 travels downwardly through its staking stroke against the resistive force of a compression spring 40. The compression spring is interposed between the top of the clamp pads 42 and the underside of the staking tool head 30. As the staking tool 28 moves downwardly through its staking stroke it compresses the spring 40 and heightens the clamping force applied by the clamp pads 42 against the assembly of inner and outer sections 16 and 18. The clamping force is at its maximum when the staking tool 28 is at the bottom of its staking stroke. As a consequence, fluent material of the projection 22, e.g. heat softened plastic, is prevented from escaping the site of the staking operation by outward extrusion between the clamp pads 42 and the surface of the inner section 16.

Figure 4:
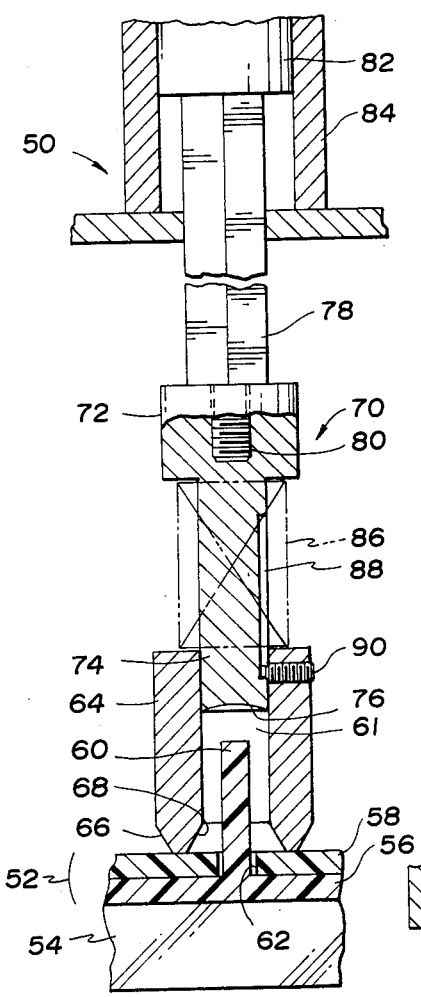
FIG. 4 is a more detailed view, partially in section, of a staking device of the present invention in position preparatory to the staking stroke of the tool.
Figure 5:
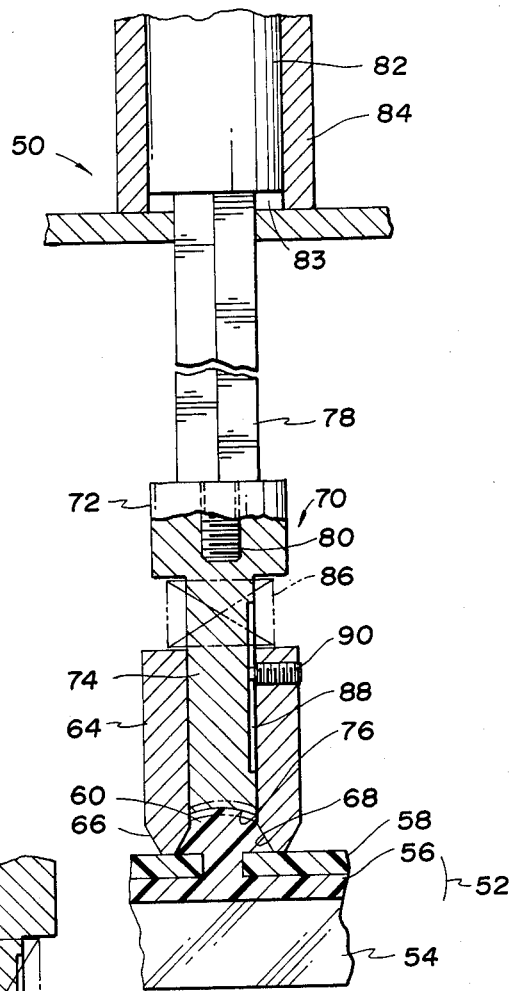
FIG. 5 is the device of FIG. 4, however, showing the staking tool in extended position at the bottom of the staking stroke.
Figure 6:
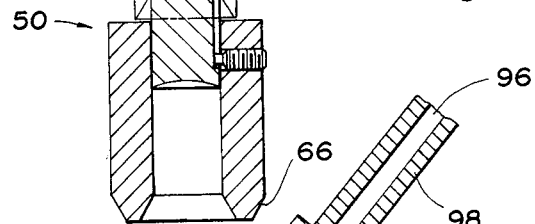
FIG. 6 is another view of the device of FIG. 4, however, showing the staking device in its retracted position while the projection undergoes heat softening.
Figure 6:
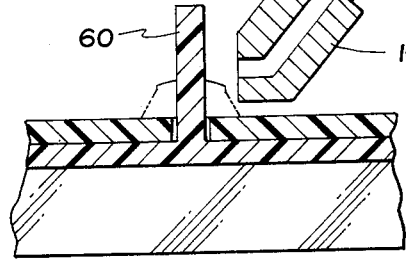

FIGS. 4, 5 and 6 shown in more detailed form a staking device of the present invention in three different phases of operation. More particularly, FIG. 4 illustrates a staking device with the clamp pads in place just prior to the commencement of the staking stroke. FIG. 5 shows the staking device with the tool having completed the staking stroke. FIG. 6 illustrates the staking device in its home position retracted from the site of the work.

With reference to FIG. 4, the staking device 50 is shown in position preparatory to staking a projection 60 to secure an assembly 52 comprised of articles 56 and 58. The projection 60 may be a plastic molded boss or stud formed integrally with the lower article 56. The upper article 58 has an aperture 62 formed therein to receive the projection 60. The assembly 52 is supported on a platen 54 or other fixed reference surface.

As the staking device 50 is brought into the position shown in FIG. 4, the clamp pads 64 contact and bear against the upper surface of article 58 and surround the projection 60. The lower ends of the clamp pads 64 terminate to an outer bevel 66 and in inner bevel 68 of a desired shape appropriate to the staked head.

A staking tool, generally indicated at 70, has reciprocal vertical travel within the clamp pads 64. The staking tool 70 comprises a head 72 and a shank 74. The staking tool 70 is connected to a driving rod 78 by a threaded connection indicated at 80. The driving rod 78 can have a square cross section as shown to provide an anti-rotation feature. The rod 78 is, in turn, connected to an actuator 82 which may be driven by any of several means, such as mechanical, hydraulic or other conventional techniques. The actuator 82 has reciprocal travel within a housing shown schematically at 84.

The lower end of the staking tool 70 terminates in a die surface 76 of shape complementary to the desired shape of the staked head. In the present case where the projection 60 is cylindrical, the die surface 76 may be of a hemispherical shape. The inner walls of the clamp pads 64 and the die surface 76 collectively define a cavity or volume 61 that confines the projection 60 and prevents it from bending or spattering from the work site during the staking stroke of the tool 70.

The shank 74 of the staking tool 70 has formed in it a guide 88. The guide 88 is a longitudinal slot or track whose length defines the range of vertical displacement of the staking tool 70 relative to the clamp pad 64. A keeper 90 in the form of a set screw or the like runs in the guide 88.

The vertical movement of the staking tool 70 relative to the clamp pad 64 is under the influence of a compression spring 86. The spring 86 is interposed between the top surface of the clamp pad 64 and the underside of the staking tool head 72. In FIGS. 4 and 6, the compression spring 86 is under minimum operating load when the staking tool 70 is at the top of the staking stroke. As seen in FIG. 5, the compression spring 86 experiences its maximum operating load when the staking tool 70 is at the bottom of the staking stroke.

It is apparent that the function of the keeper 90 is to limit the range of vertical displacement of the staking tool 70 relative to the clamp pad 64. In FIGS. 4 and 6, the staking tool 70 is shown at its uppermost position relative to the clamp pads 64. In FIG. 5, the keeper 90 experiences relative vertical displacement in the guide 88 as the staking tool 70 moves through the staking stroke.

With reference to FIG. 5, the projection 60 is now shown in the form of a staked head. The shape of the head 60 is defined by the effective die cavity made up of the hemispherical surface of the die tip 76 and the inner beveled surfaces 68 of the clamp pad 64. Thus, the clamp pads 64 perform the function of not only securing the articles 56 and 48 in fixed position, but also form a portion of the shape of the die cavity which defines the resultant shape of the staked head.

The phantom lines shown just above and below the die tip 76 in FIG. 5 indicate adjustments in the bottom point of the staking stroke to accomodate variations in the dimensions of the projection 60 or the staking device members. That is, if the projection 60 is oversized, the upper phantom line indicates the bottom point in the staking stroke. Alternatively, if the projection 60 is undersized, the staking stroke extends further downward such that the bottom point of the staking stroke is shown by the lower phantom line. Within either extreme, the staked head is uniformly formed to promote greater holding strength for the assembly 52.

As can also be seen in FIG. 5, the actuator 82 has stroke to go, as shown at 83, even as the volume of the projection 60 is displaced to fill the cavity defined by the die tip 76 and the inner beveled surfaces 68.

It is important to note once more that at the bottom of the staking stroke of the tool 70 the compression spring 85 is experiencing maximum compression and the restorative force from the spring 86 is transmitted to the clamp pads 64. Accordingly, maximum clamping force is applied to the assembly 52 at the botom of the staking stroke to prevent escape of fluent material from the work site.

With reference to FIG. 6, the staking device 50 is shown in retracted position. At this stage, the projection 60 may be prepared for staking, such as by heat softening. For this purpose superheated air is applied to the projection 60. The superheating of the air is obtained by conducting air through a passage 96 which includes a heater band 98 and a nozzle 100. The outer beveled surface 66 serves as a cam to laterally displace the nozzle 100 on downward travel of the staking device 50.

In practicing the staking steps shown by FIGS. 4, 5 and 6, the die tip 76 and clamp pads 64 are kept cooler than the solidification temperature of the projection 60, and preferably cooler than the creep temperature of the plastic. However, if the staking were to be performed by spin staking or hot tip tool staking, the clamp pads 64 could be chilled to permit solidification of the formed heads when the tool tip 76 is retracted from the work site, i.e. in the relative positions shown in FIG. 4. As those having skill in the art will appreciate, the present invention can also be adapted to spin staking or other forms of staking.

Figure 7:
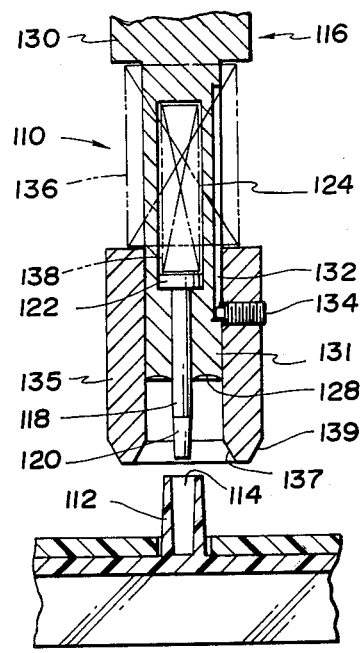
FIG. 7 is an alternative embodiment of a staking device according to the present invention in a form suited for staking a hollow boss.
Figure 8:
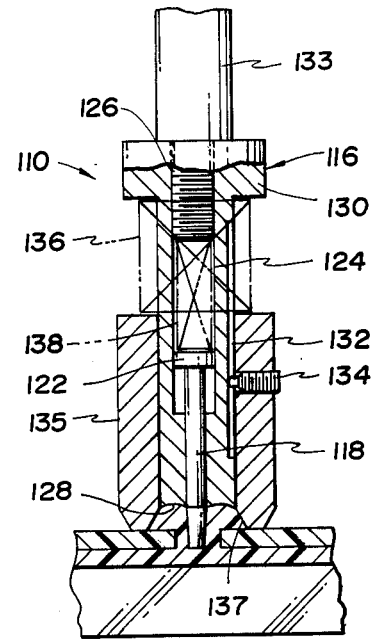
FIG. 8 is another view of the staking device of FIG. 7 showing the tool at the bottom of the staking stroke.

With reference to FIGS. 7 and 8, an alternative embodiment of a staking device of the present invention, indicated generally at 110, is adapted for staking a hollow boss 112. The hollow boss includes a central, longitudinal opening 114.

In this case, the tool body, generally indicated at 116, includes a mandrel 118 which terminates at its lower end in a tapered segment 120 and at its upper end in a head 122. The tool body 116 has a cavity 124 which contains a compression spring indicated schematically at 138. The lower portion of the spring is loaded against the head 122 of the mandrel 118 such that vertical displacement of the mandrel 118 relative to the tool body 116 will be resisted or assisted by the restorative force of the compression spring 138.

The shank 131 of the staking tool 116 has a generally annular shape and terminates at its lower end in a die surface 128 of shape corresponding to the cross section of the hollow boss 112. The staking tool 116 terminates at its upper end in a head 130. As best seen in Figure 8, the head 130 is attached by threaded fastener 126 to a driving rod 133.

The staking tool 116 travels in the usual reciprocal fashion within clamp pads 135. The clamp pads 135 terminate at their lower ends in the inner and outer beveled surfaces 137 and 139 characteristic of the present invention. The limits of vertical motion of the staking tool 116 relative to the clamp pads 135 are defined by the cooperation of the keeper 134 and guide 132 formed as a longitudinal slot or track in the shank 131 of the staked tool 16 in the previously described arrangement.

The operation of the staking device 110 of FIGS. 7 and 8 is described as follows. The device 110 is brought into position such that the mandrel 118 is aligned concentrically with the aperture 114 in the hollow boss 112. The clamp pads 135 are brought into clamping position against the assembled articles. This action brings the mandrel 118 into registering position with the aperture 114 and the hollow boss 112. The mandrel 118 is spring loaded against the resistive force of the compression spring 124 when placed in registering position in the hollow boss 112.

The tool 116 then begins the staking stroke by downward travel against the resistive force of the spring 136. As best seen in FIG. 8, the spring 136 undergoes compression and applies downward force against the clamp pads 135. The hollow boss undergoes formation as the tool 116 advances through its staking stroke. As the tool 116 reaches the botom of the staking stroke the boss is formed into a head whose shape is defined by the die cavity which is, in turn, defined by the inner beveled surfaces 137 of the clamp pads and the die surface 128 of the lower tip of the tool shank 131.

The use of a spring loaded mandrel is a preferred design choice, but not a requirement. A solidly connected mandrel would also function effectively in keeping with the practice of the present invention.

Figure 9:
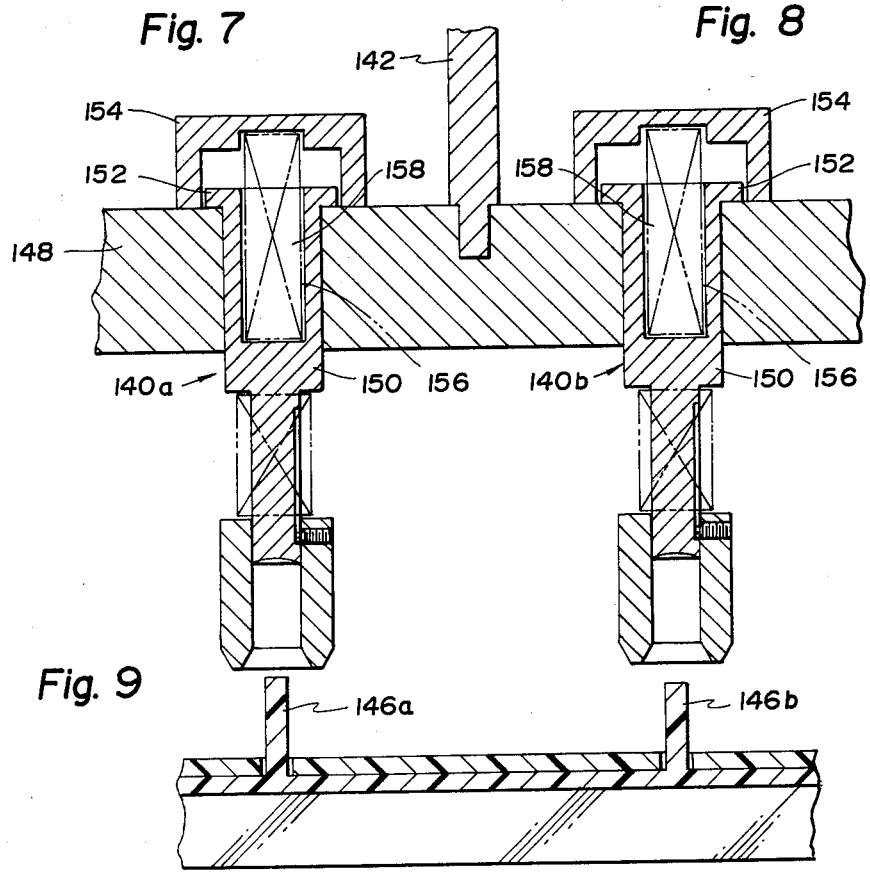
FIG. 9 is yet another alternative embodiment of the apparatus of the present invention showing plural staking devices being commonly actuated with provision for compensation in tool and material dimensions.

FIG. 9 illustrates the staking device of FIGS. 4, 5 and 6 modified for use in an arrangement where plural projections can be staked in a simultaneous operation with a single actuator. For example, for the simultaneous staking of projections 146a and 146b.

More specifically, each staking device 140a and 140b is mounted on a carrier 148 which is actuated with reciprocal, vertical travel by a rod 142. The rod 142 may be driven by conventional means, such as hydraulic or mechanical. The staking tool of each device 140 has a modified head portion 150 which terminates at its upper end in an integral circumferential flange 152. Each head 150 has formed therein a central axial opening 158. A compression spring 156 is disposed within the central axial opening 158 and has its lower end bearing against the lower surface of the opening. The upper end of the spring is loaded against a cap or housing 154. The spring constant is sufficient to normally seat the flange 152 against the upper surface of the carrier 148 during the staking operation.

A feature of the design of the staking devices 140 is that compensation can be made for variations in the dimensions of the projections 146a and 146b, or the tools, or both. More specifically, the projection 146a is slightly larger then the projection 146b, and, therefore, the staking tools of each device will have slightly different staking strokes, i.e. one will bottom out before the other. In that case, the device which has bottomed out first responds by experiencing upward displacement of the tool head 150 relative to the carrier 148. In other words, each tool is directly driven by the carrier 148 through its respective staking stroke, but experiences lost motion relative to the carrier through compression of the spring 156 for driving motion of the carrier beyond the staking stroke of the respective tool.

On return of the staking tool to its retracted position, the tool head 150 returns to its normal position i.e. with the circumferential flange 152 resting against the upper surface of the carrier 148.

The invention has been described in several embodiments, and the description provided herein is not intended to be limiting but instead illustrative of the various embodiments in which the invention may be practiced. Alternative embodiments will suggest themselves to those having skill in the art without departing from the scope of the following claims.

The embodiments of the invention in which an exclusive property of privilege is claimed are defined as follows:

1. A device for staking a formable plastic projection onto a work surface comprising:
   clamp means, adapted to contact the work surface, for retaining the work in fixed position;
   tool means, having travel between a retracted position and an extended position to define a staking stroke, for engaging said projection to form a staked head; and
   bias means, interposed between the tool means and the clamp means and responsive to movement of the tool means through the staking stroke, to thereby apply a progressive clamping force on the work surface of sufficient magnitude to retain the work in fixed position during formation of the staked head.

2. The device of claim 1 wherein the bais means is a compression spring.

3. The device of claim 1 wherein the tool means has reciprocal travel relative to the clamp means.

4. The device of claim 1 wherein the tool means includes a die surface adapted to engage and form the projection.

5. The device of claim 1 wherein the clamp means is configured to surround the formable projection to prevent escape of material from the work site.

6. The device of claim 1 wherein the clamp means has a central opening for receiving the projection and the tool means has reciprocal travel within said central opening.

7. The device of claim 6 wherein the bias means comprises a compression spring disposed between the tool means and the clamp means and which resists travel of the tool means through the staking stroke.

8. The device of claim 1 further comprising limit means associated with the tool means for limiting the range of travel of the tool means relative to the clamp means.

9. The device of claim 8 wherein the limit means comprises a guide formed in the tool means in which a keeper on the clamp means is disposed.

10. The device of claim 1 further comprising means for preventing rotation of the tool means relative to the work.

11. The device as defined in claim 1 wherein the tool means includes a tool tip having a die surface formed thereon, and further wherein said tool tip is cooperative with said clamp means to define a die cavity for forming the staked head when the tool means is proximate its extended position.

12. The device as defined in claim 1 wherein the formable projection is of the type having a central axial opening and the tool means includes a mandrel for registering with said opening during the staking stroke.

13. The device as defined in claim 12 wherein the tool means includes a die tip for forming the staked head, and further comprising retention means for retaining the mandrel in registering position prior to engagement of the tool tip with the projection and subsequent to its retraction from the staked head.

14. The device as defined in claim 13 wherein the retention means includes spring means for biasing the mandrel toward the work surface.

15. A device for staking a heat softened plastic projection onto a work surface comprising:
   clamp means, adapted to contact the work surface in surrounding relation to the projection, for retaining the work in fixed position;
   tool means, having travel between a retracted position and an extended position to define a staking stroke, for forming the projection, and wherein the tool means in its extended position is cooperative with the clamp means to define a die cavity tocontainthe flow of the sofented plastic during formation and thereby define the shape of the staked head.

16. The device of claim 15 wherein the clamp means includes a clamp pad for contacting the work, said pad having an inwardly converging inner wall segment adapted to define a portion of said die cavity.

17. The device of claim 15 wherein the tool means includes a die tip for contacting the formable projection, said tip terminating in a die surface adapted to define a portion of said die cavity.

18. The device of claim 15 further comprising bias means, interposed between the clamp means and the tool means, and responsive to travel of the tool means through the staking stroke to thereby apply a progressive clamping force on the work surface of sufficient magnitude to retain the work in fixed position during formation of the staked head.

19. The device of claim 15 wherein the bias means comprises a compression spring.

* * * * *